(12) United States Patent
Bejerasco et al.

(10) Patent No.: US 10,474,810 B2
(45) Date of Patent: Nov. 12, 2019

(54) CONTROLLING ACCESS TO WEB RESOURCES

(71) Applicant: F-Secure Corporation, Helsinki (FI)

(72) Inventors: Christine Bejerasco, Helsinki (FI); Karmina Aquino, Helsinki (FI)

(73) Assignee: F-Secure Corporation, Helsinki (FI)

( * ) Notice: Subject to any disclaimer, the term of this patent is extended or adjusted under 35 U.S.C. 154(b) by 376 days.

(21) Appl. No.: 15/258,009

(22) Filed: Sep. 7, 2016

(65) Prior Publication Data

US 2017/0070460 A1 Mar. 9, 2017

(30) Foreign Application Priority Data

Sep. 8, 2015 (GB) .................................. 1515904.9

(51) Int. Cl.
| | |
|---|---|
| *G06F 21/51* | (2013.01) |
| *H04L 12/58* | (2006.01) |
| *H04L 29/08* | (2006.01) |
| *H04L 29/06* | (2006.01) |
| *G06F 21/55* | (2013.01) |
| *H04L 29/12* | (2006.01) |

(52) U.S. Cl.
CPC .............. *G06F 21/51* (2013.01); *G06F 21/55* (2013.01); *G06F 21/552* (2013.01); *H04L 51/04* (2013.01); *H04L 51/12* (2013.01); *H04L 51/18* (2013.01); *H04L 61/30* (2013.01); *H04L 63/20* (2013.01); *H04L 67/02* (2013.01)

(58) Field of Classification Search
CPC ......... H04L 61/30; H04L 67/02; H04L 63/20; G06F 21/51; G06F 21/552; G06N 5/02
See application file for complete search history.

(56) References Cited

U.S. PATENT DOCUMENTS

| | | | |
|---|---|---|---|
| 8,473,442 B1 * | 6/2013 | Deninger ................. | G06N 5/02 706/47 |
| 8,839,369 B1 | 9/2014 | Dai et al. .......................... | 726/3 |
| 2004/0078422 A1 | 4/2004 | Toomey ........................ | 709/202 |
| 2008/0163369 A1 * | 7/2008 | Chang ..................... | G06F 21/51 726/22 |
| 2012/0304292 A1 * | 11/2012 | Liu ......................... | H04L 61/30 726/22 |

* cited by examiner

*Primary Examiner* — Kyung H Shin
(74) *Attorney, Agent, or Firm* — Harrington & Smith

(57) ABSTRACT

The invention relates to a method including at a user device: receiving a communication message over the Internet or other network; analysing web resource data related to one or more web resource hyperlinks included in the received communication message to find any user logging in elements by detecting functions for verifying the validity of inputs, the logging in element being used to control user access by identifying and authenticating the user through credentials inputted by the user; and in the event that any logging in elements are found, blocking access to the related web resource having the logging in element.

23 Claims, 5 Drawing Sheets

---

WEBSITE BLOCKED!

Potential Phishing Page

This page has been blocked because you clicked on a link from an email that leads to a website which expects you to input sensitive and private information.

If you trust this link, you may add it to the whitelist. If you would also like to help improve our ratings, please click on the button.

| Add to Whitelist only | Add to Whitelist and notify F-secure |

CONTROLLING ACCESS TO WEB RESOURCES

TECHNICAL FIELD

The exemplary and non-limiting embodiments of the present application are related generally to methods, apparatuses and computer programs and, more specifically, to the field of controlling access to web resources.

BACKGROUND

Phishing is an attempt to acquire sensitive information such as usernames, passwords and credit card details for malicious reasons by masquerading as trustworthy entity in an electronic communications. Phishing emails, for example, may contain links to websites that are expecting users to input their information. Among others, phishing may be carried out by email spoofing or instant messaging, for example, and it often directs users to enter details at a fake website that may look and feel almost identical to the legitimate one. The main distribution vector for phishing websites are different communication messages, such as emails. After a phishing web page is setup, people are typically spammed with messages in order to lure them to visit the phishing web page and enable the attackers to acquire their credentials.

Current security applications are used to prevent web users from visiting malicious uniform resource locators (URLs). This protects user's computer systems from executing malicious or unwanted software and helps avoiding malicious attacks via illegitimate webpages. Also different reputation systems are used by the security applications to evaluate the safety of accessed webpages. However, it is challenging to keep up-to-date with the huge amount of new phishing websites that are established continuously. For example, it is common that trusted banking websites are attacked by phishing attempts. Also geolocation-specific phishing in certain countries where security services may have no visibility at all have become a problem.

SUMMARY

Various aspects of examples of the invention are set out in the claims.

According to an aspect of the invention, there is provided a method as specified in claim 1.

According to an aspect of the invention, there is provided a user device as specified in claim 11.

According to an aspect of the invention, there is provided a method as specified in claim 19.

According to an aspect of the invention there is provided a computer program product and computer programs as specified in claims 22-25.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the depended claims.

BRIEF DESCRIPTION OF THE DRAWINGS

The accompanying drawings provide a more complete understanding of the embodiments of the present invention according to the following descriptions.

DETAILED DESCRIPTION

The present invention can apply to any processing system, terminal, server, corresponding component, or to any computer system or combination of different communications systems that support the required functionality. Due to the rapid development of the specifications of computer systems and protocols that are used, all words and expressions should be interpreted broadly; they are intended only to illustrate the embodiment.

Figure 1:
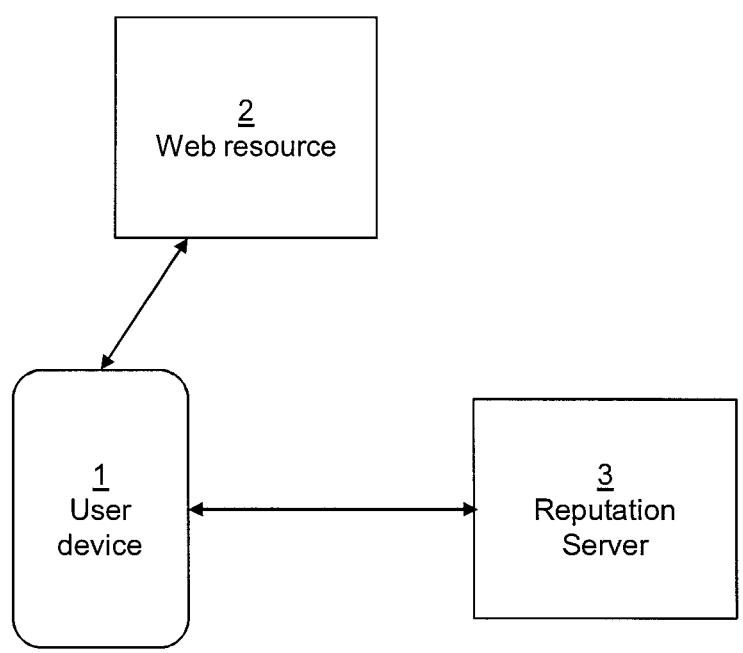
FIG. 1 illustrates schematically in a block diagram an exemplary network architecture.
Figure 5:
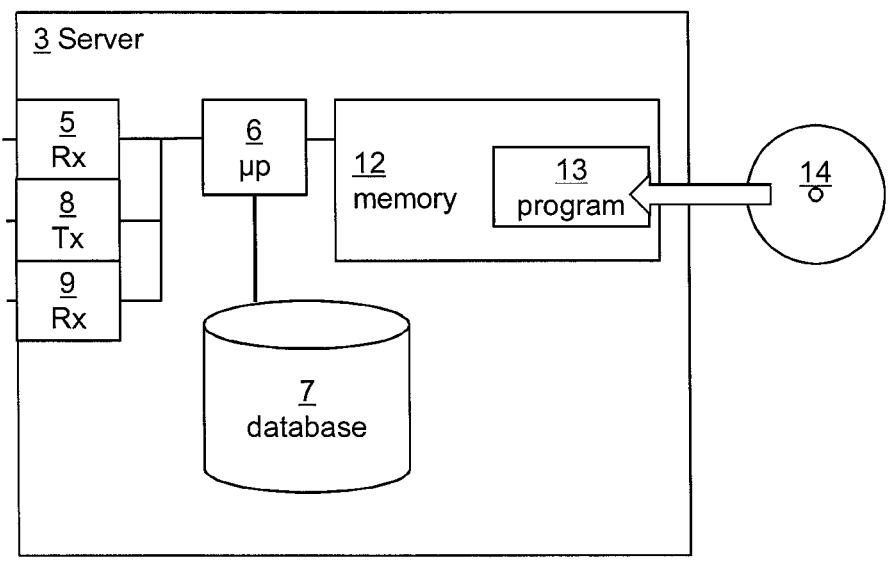
FIG. 5 illustrates schematically in a block diagram a server.
Figure 6:
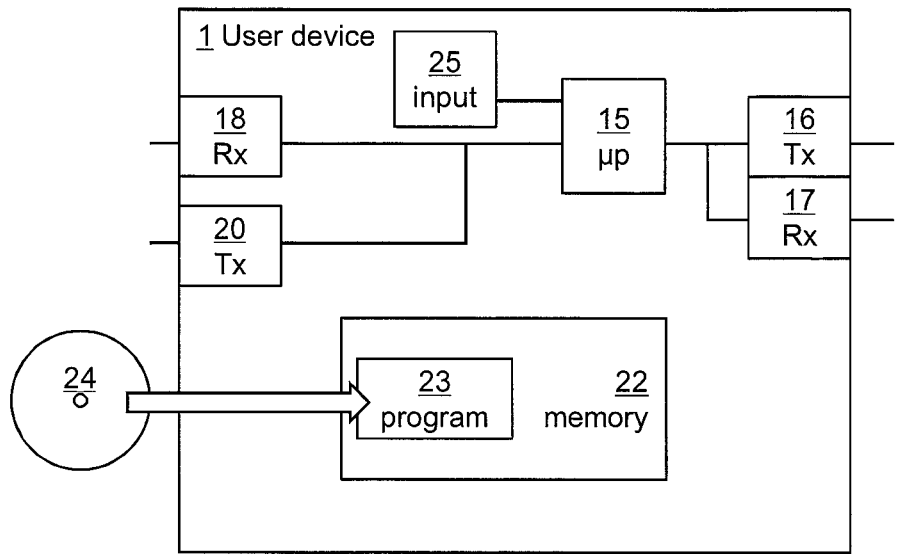
FIG. 6 illustrates schematically in a block diagram a user device.

FIGS. 1, 5 and 6 illustrate general examples of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in the figures. The connections shown are logical connections and the actual physical connections may be different. It is apparent to a person skilled in the field that the arrangement may also comprise other functions and structures. For example, the functional entities of the user device 1 may physically reside in separate locations also. Some or part of the device processes may be implemented using cloud computing in which resources are provided to a local client on an on-demand basis, usually by means of the Internet.

FIG. 1 shows a simple network architecture in which a user device 1, such as a personal computer, smartphone, mobile phone, laptop or tablet, is in communication with other network elements such as web resources 2 in the Internet. A web resource may refer to direct targets of uniform resource locators (URLs)—e.g. the web page retrieved directly by clicking on a link—but may also be a referent of any uniform resource identifier or internationalized resource identifier. A web resource ("web resource data") may alternatively be related to a URL or other resource identifier indirectly. For example, a web resource may be accessible by following a URL to a web page and then following a further hyperlink to the web resource. Of course, there may be any number of hyperlinked web pages which are traversed before the web resource is reached. The web resource may also be an indirect target of a URL as a result of URL redirection (URL forwarding). The web resource may comprise every 'thing' or entity that can be identified, named, addressed or handled, in any way, in the web at large, or in any network information system. The user device 1 is in communication with a reputation server 3 and can also connect to other data sources. The devices may connect by any suitable communications network, for example via the Internet.

Known methods to protect a user from accessing malicious web resources, such as phishing sites, by individually assessing the safety of each destination URL, or by scanning all files hosted on a site, can be time consuming and resource-intensive. There are proposed herein methods and apparatus to protect a user by blocking access to web resources having logging in elements. This reduces the risk of attackers gaining user credentials, passwords and/or confidential data. In an embodiment, information may be used that may already be available to the server 3, for example via a database. In an embodiment, the known information is used to analyze user queries regarding the web resource 2 to be accessed. In this case, the server 3 can determine if the URL requested by the user device is trusted or not. By using prior knowledge on the web resource reputation, the user can be offered another layer of protection against potential phishing attacks, and their online existence can be made more secure.

Figure 2:
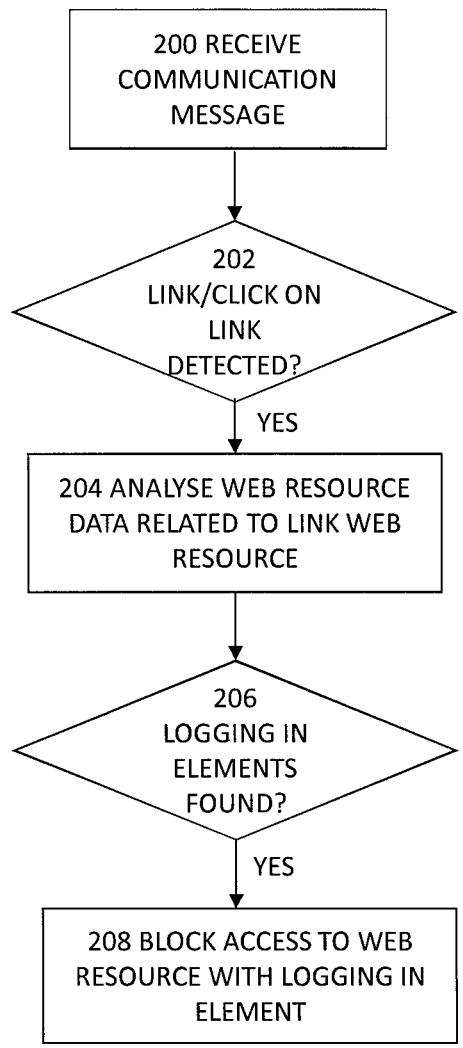
FIGS. 2 and 3 are flow diagrams showing exemplary steps.

FIG. 2 is a flow diagram that illustrates an example method. In step 200 a user device 1 receives a communication message. The communication message may be any of an email, an instant messaging message, a social network site post, a web resource comment, or any other form of electronic messaging that can be received by the user device 1.

In 202, the user device 1 analyses the contents of the received communication message for hyperlinks, that is, references to data that the reader can directly follow for example by clicking or hovering. In an embodiment, the user device observes whether any selection of hyperlinks are detected, that is, whether the user has clicked on a hyperlink in the communication message. If any hyperlinks or selection of a hyperlink are detected, then 204 is entered where web resource data related to the hyperlink is analysed. In 206, if any logging in elements are found on the basis of the analysis, then 208 is entered where access to the web resource with the detected logging in element is blocked. Logging in refers to the credentials required to obtain access to a computer system or other restricted area. Logging in or signing in is the process by which individual access to a computer system is controlled by identifying and authenticating the user through the credentials presented by the user. Logging in is usually used to enter a specific page, which others cannot see. The logging in element is a certain area or space rendered to the display of a user device where the user is expected to enter their credentials.

There are many different ways to detect whether logging in elements are present. For example, logging in elements may be found by analysing any of: keywords, HTML tags, script code and data POST actions that correspond to a website having a logging in element. Also any other elements or pieces of data or any code element that indicates a logging in scenario may be used to detect presence of logging in elements. For example, the analysis may range from simple tag checks to functions that are verifying validity of inputs such as email addresses. In the following example, a phishing page: hxxp://autobkashcashin.wapka.mobi/site_0.xhtml contains the following codes:

<input type="text"name="mf_text[Email]" class="input"/>
<div class="mobile-login-field aclb apl"><div> Password<br/>
<input type="submit" name="MF submit" class="btn btnC largeStn" size="0" value="Log In"/>
<form method="post" class="mobile-login-form_fcp" onSubmit="window.open ('http://facebook.com')" action="site_0.xhtml">

After the webpage has been parsed and these elements have been found, it can be determined that this webpage is expecting an email address and password login. Then access to this webpage is blocked in 208.

Figure 3:
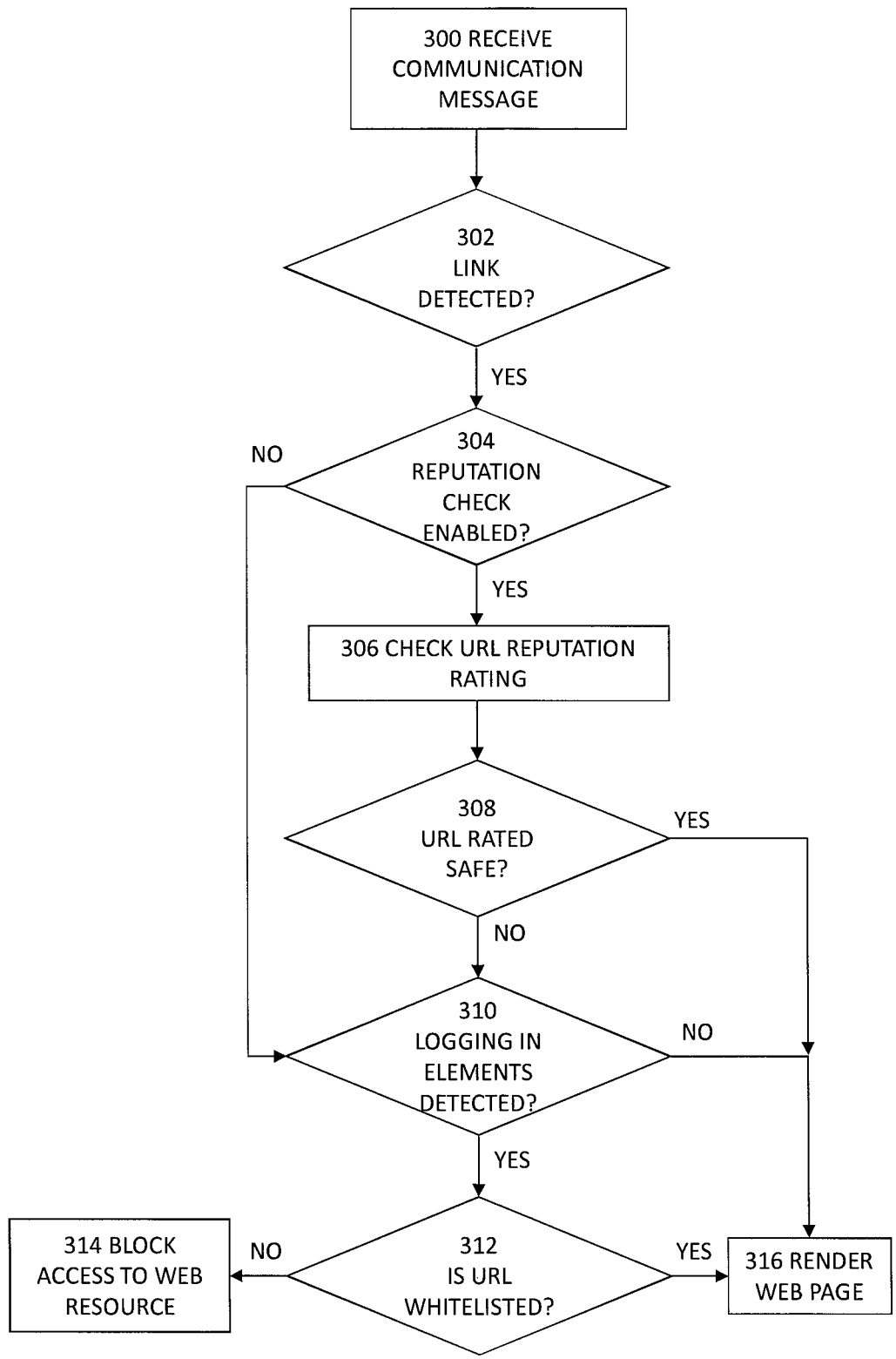

FIG. 3 is a flow diagram that illustrates another example method. In step 300 a user device 1 receives a communication message.

In 302, the user device 1 analyses the contents of the received communication message for hyperlinks. If any, hyperlinks are detected, then 304 is entered where the user device checks whether a reputation check is enabled. If so, then 306 is entered where URL reputation rating is checked for the related hyperlink. In an embodiment, the reputation rating is requested from the server system 3. The server 3 may maintain a database of web page reputation rating information. This database may comprise URLs and categorization information that is updated regularly. The updates may be based on web page analysis and/or reputation information that is received from other systems or client computers. In another embodiment, the user device 1 may download and maintain the reputation rating information in its own database. In that case, the user device 1 may download updates of the reputation data that is related to URL reputation rating regularly. The reputation rating data may comprise categorization information and/or indication of whether or not the relating web page can be trusted, or is unwanted.

In 308, the user device 1 determines whether the specific web page can be trusted or not on the basis of the check. In case the user device 1 determines that a specific URL can be trusted, 316 can be entered directly where access to the web page is allowed and the web page is rendered to the display of the user device 1. In case the user device 1 determines that the specific URL cannot be trusted based on the reputation check, then 310 is entered where presence of any logging in elements is analysed. In 310, if no logging in elements are found, then 316 is entered. In an embodiment, even though the URL was categorized as not safe in 308, however, since no logging in elements were found, access to the web page can be allowed. It is possible that a warning message is still displayed on the display of the user device 1 indicating the reputation rating of the web page to be accessed. In 310, if any logging in elements are found on the basis of the analysis, then 312 is entered where the user device 1 checks whether the requested URL can be found on a whitelist. The whitelist is a list of URLs that are being provided access to even though the reputation of the URL may be rated suspicious or unsafe. In this case, if the URL is on the whitelist and even though logging in elements are found, 316 is entered, where access to the web page is allowed. However, it is possible that a warning message is displayed on the display to indicate the user that the accessed web page has logging in elements and that it has been rated unsafe but is listed on the whitelist, for example.

Figure 4:
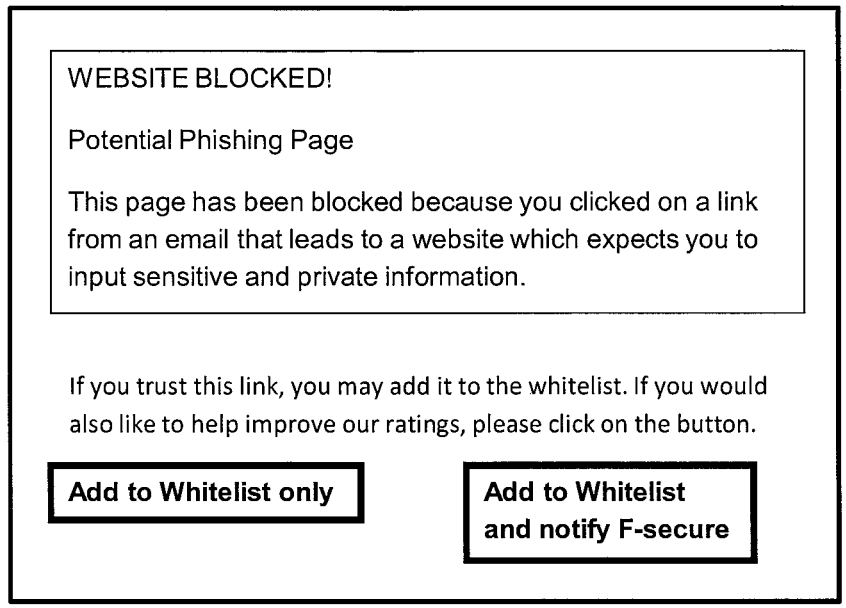
FIG. 4 shows an exemplary warning message to be sent to a user attempting to access a web resource.

In 312, if the URL is not whitelisted, then 314 is entered where access to the web page is blocked. In an embodiment, the user device displays an indication to the display about the blocked URL. FIG. 4 shows an example of a warning message. In an embodiment, the user can be allowed an opportunity to add the blocked URL to the whitelist. If the user device detects a request to add the URL to the whitelist, then access to the blocked URL may be allowed. In an embodiment, in addition to adding the URL to the whitelist, the user may be requested to notify the server system 3 that the URL has been whitelisted. This enables the server system 3 to improve its ratings.

FIG. 5 shows an exemplary server 3. The server 3 is provided with a first receiver 5 that can receive a message from the user device 1 that includes information of the URL to be accessed by the user device. A processor 6 is provided to compare the received URL information with known URL reputation data. This may be done by querying a database 7. The database is shown in this example as being located at the server 3, but it will be appreciated that the server 3 could alternatively access a remote database. The database 7 contains information relating to known URLs and reputation data thereof.

A first transmitter 8 is provided for sending to the user device 1 a message indicating the reputation data related to the requested URL.

The server 3 may be provided with a second receiver 9 that can receive other data, such as false alarm or whitelisting data, from user devices relating to reputation of URLs. The processor 6 in this case is arranged to consider using the received data to improve reputation ratings in the database 7.

In the above description, the server 3 is described as having different transmitters and receivers. It will be appreciated that these may be disposed in any suitable manner, for example in a single transmitter and receiver, a transceiver and so on. Similarly, a single processor 6 is described but it will be appreciated that the function of the processor may be performed by a single physical processor or by more than one processor.

The server 3 is also provided with a non-transitory computer readable medium in the form of a memory 12. The memory may be used to store a computer program 13 which, when executed by the processor 6, causes the processor 6 to perform the functions described above. Note that the computer program 13 may be provided from an external source 14 such as a carrier wave, a flash disk, a disk and so on.

Turning now to FIG. 6, there is shown an exemplary user device 1. A first receiver 17 is provided that is arranged to receive a communication message over the Internet or other network. A processor 15 is provided that is arranged to analyse web resource data related to one or more web resource hyperlinks included in the received communication message to find any user logging in elements, the logging in element being used to control user access by identifying and authenticating the user through credentials inputted by the user. In the event that any logging in elements are found, the processor 15 is arranged to block access to the related web resource having the logging in element.

In an embodiment, the processor 15 is arranged to analyse the web resource data by parsing the web resource data for identifying any data indicative of a logging in element.

A first transmitter 16 is provided that can request reputation rating data relating to the web resource from a server system. A second receiver 18 is provided that can receive the reputation rating data from the server system. In an embodiment, the processor 15 is further arranged to allow access to the web resource having the logging element when the web resource is determined to be safe based on a reputation check.

In an embodiment, the processor 15 is arranged to detect a user selection of the web resource hyper link in the communication message and analysing the web resource data related only to the selected web resource to find any user logging in elements.

In an embodiment, the processor 15 is arranged to allow access to the web resource having the logging element when the web resource is included in a whitelist of allowed web resources.

In an embodiment, the processor 15 is arranged to display a warning message at the client device when the access to the related web resource has been blocked.

In an embodiment, the processor 15 is arranged to receive a user indication to add the blocked web resource to a whitelist of allowed web resources, and allow access to the web resource after receiving the user indication. The user indication can be received via a user input 25 of the user device 1. The user input 25 is used by the user to input information such as a selection of whether to add URL to a whitelist.

A second transmitter 20 may be arranged to transmit a notification to a security server regarding a false positive being detected.

In the above description, the user device 1 is described as having different transmitters and receivers. It will be appreciated that these may be disposed in any suitable manner, for example in a single transmitter and receiver, a transceiver and so on. Similarly, a single processor 15 is described but it will be appreciated that the function of the processor may be performed by a single physical processor or by more than one processor.

The user device 1 is also provided with a non-transitory computer readable medium in the form of a memory 22. The memory may be used to store a computer program 23 which, when executed by the processor 15, causes the processor 15 to perform the functions described above. Note that the computer program 23 may be provided from an external source 24 such as a carrier wave, a flash disk, a disk and so on. The memory 22 may also be allocated a region for storing the downloaded electronic file for metadata extraction. An anti-virus application may also be implemented in use by code, stored in the hard disk drive, running on the processor.

Figure 7:
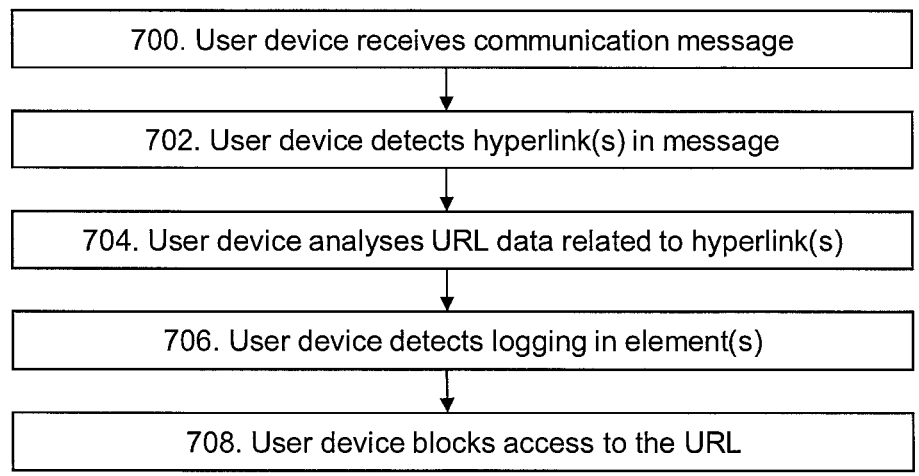
FIG. 7 is a flow diagram showing exemplary steps at a user device.

FIG. 7 is a flow diagram showing exemplary steps at the user device 1.

700. The user device 1 receives a communication message over the Internet or other network.

702. The user device detects hyperlink(s) in the communication message. The detection of hyperlink(s) may result in user selecting a specific hyperlink (clicking on) in an email, for example. Alternatively, the user device may detect hyperlink(s) by analysing the contents of the communication message. In an embodiment, a browser emulator or a pre-fetcher element may be used to evaluate all the hyperlinks in the communication message.

704. The user device analyses web resource data related to one or more web resource hyperlinks included in the received communication message to find any user logging in elements.

706. The user device detects logging in element(s).

708. The user device blocks access to the related web resource having the logging in element.

It will be appreciated by the person skilled in the art that various modifications may be made to the above described embodiment without departing from the scope of the present invention. For example, the database is described as being located at the server, but it will be apparent that the database may be located in a separate entity to the server, in which case the server will send queries remotely to the database.

The steps, points, signalling messages and related functions described above in relation to FIGS. 2 and 3 are in no absolute chronological order, and some of the steps may be performed simultaneously or in a different order. Other functions may also be executed between the steps or within the steps, and other signalling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or an article of manufacture which can contain, store, or maintain programming, data or digital information for use by or in connection with an instruction execution system, including the processor in the exemplary embodiment.

An embodiment provides a computer program product that comprises a computer-readable medium bearing a computer program code that is embodied therein for use with a computer. The computer program code comprises a code for receiving a communication message over the Internet or other network; a code for analysing web resource data related to one or more web resource hyperlinks included in the received communication message to find any user logging in elements, the logging in element being used to control user access by identifying and authenticating the user through credentials inputted by the user; and a code for blocking access to the related web resource having the logging in element in the event that any logging in elements are found.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

The invention claimed is:

1. A method comprising, at a user device:
   receiving a communication message over the Internet or other network;
   analysing web resource data related to one or more web resource hyperlinks included in the received communication message utilizing emulator or a pre-fetcher element to find any user logging in elements by detecting functions for verifying the validity of inputs and wherein the logging in element being used to control user access by identifying and authenticating the user through credentials inputted by the user, wherein the logging in element is used to enter a specific page and rendered to the displays of a user device where the user is expected to enter their credentials; and
   in the event that any logging in elements are found, blocking access to the related web resource having the logging in element.

2. The method according to claim 1, further comprising detecting a user selection of the web resource hyper link in the communication message and analysing the web resource data related only to the selected web resource to find any user logging in elements.

3. The method according to claim 1, further comprising allowing access to the web resource having the logging in element when the web resource is included in a whitelist of allowed web resources.

4. The method according to claim 1, further comprising allowing access to the web resource having the logging in element when the web resource is determined to be safe based on a reputation check.

5. The method according to claim 1, further comprising displaying a warning message at the client device when the access to the related web resource has been blocked.

6. The method according to claim 1, further comprising receiving a user indication to add the blocked web resource to a whitelist of allowed web resources, and allowing access to the web resource after receiving the user indication.

7. The method according to claim 1, further comprising transmitting a notification to a security server regarding a false positive.

8. The method according to claim 1, wherein analysing the web resource data comprises parsing the web resource data for identifying any data indicative of a logging in element.

9. The method according to claim 8, wherein the data indicative of a logging in element comprises any one of a keyword, an HTML tag, a script code, and a POST request.

10. The method according to claim 1, wherein the communication message comprises any one of an email, an instant messaging message, a social network site post, and a web resource comment.

11. A computer program product comprising a non-transitory computer-readable storage medium bearing computer program code embodied therein for use with a computer the computer program code comprising code for performing the method according to claim 1.

12. A user device for use in a communications network, the user device comprising:

a receiver arranged to receive a communication message over the Internet or other network;

a processor arranged to analyse web resource data related to one or more web resource hyperlinks included in the received communication message utilizing an emulator or a pre-fetcher element to find any user logging in elements by detecting functions for verifying the validity of inputs, the logging in element being used to control user access by identifying and authenticating the user through credentials inputted by the user wherein the logging in element is used to enter a specific page and rendered to the display of a user device where the user is expected to enter their credentials, and in the event that any logging in elements are found, to block access to the related web resource having the logging in element.

13. The user device according to claim 12, wherein the processor is further arranged to detect a user selection of the web resource hyper link in the communication message and to analyse the web resource data related only to the selected web resource to find any user logging in elements.

14. The user device according to claim 12, wherein the processor is further arranged to allow access to the web resource having the logging element when the web resource is included in a whitelist of allowed web resources.

15. The user device according to claim 12, wherein the processor is further arranged to allow access to the web resource having the logging in element when the web resource is determined to be safe based on a reputation check.

16. The user device according to claim 12, wherein the processor is further arranged to display a warning message at the client device when the access to the related web resource has been blocked.

17. The user device according to claim 12, wherein the processor is further arranged to receive a user indication to add the blocked web resource to a whitelist of allowed web resources, and to allow access to the web resource after receiving the user indication.

18. The user device according to claim 12, wherein the processor is further arranged to analyse the web resource data by parsing the web resource data for identifying any data indicative of a logging in element.

19. The user device according to claim 18, wherein the data indicative of a logging in element comprises any one of a keyword, an HTML tag, a script code, and a POST request.

20. A method comprising, at a user device:

receiving a communication message over the Internet or other network;

parsing the communication message utilizing an emulators or a pre-fetcher element to identify the presence of any web resource hyperlinks;

in the event that one or more hyperlinks are identified, prior to a user of the device selecting a hyperlink, fetching web resource data related to the or each web resource hyperlink over the Internet or said other network and analysing the web resource data to find any user logging in elements related to the entry of user identification and authentication information by detecting functions for verifying the validity of inputs wherein the logging in element is used to enter a specific page and rendered to display of a user device where the user is expected to enter their credentials; and in the event that any logging in elements are found, blocking access to the related web resource having the logging in element.

21. A method according to claim 20, wherein said logging in elements are username and password entry fields.

22. A method according to claim 20, wherein said step of blocking access to the related web resource having the logging in element comprises disabling the related web resource hyperlink in the communication message.

23. A computer program product comprising a non-transitory computer-readable storage medium computer program code embodied therein for use with a computer the computer program code comprising code for performing the method according to claim 20.

* * * * *

UNITED STATES PATENT AND TRADEMARK OFFICE
CERTIFICATE OF CORRECTION

PATENT NO. : 10,474,810 B2
APPLICATION NO. : 15/258009
DATED : November 12, 2019
INVENTOR(S) : Christine Bejerasco and Karmina Aquino Page 1 of 1

It is certified that error appears in the above-identified patent and that said Letters Patent is hereby corrected as shown below:

In the Claims

In Claim 1:
Column 8, Line 15, "emulator" should be deleted and -- an emulator -- should be inserted.

In Claim 1:
Column 8, Line 22, "displays" should be deleted and -- display -- should be inserted.

In Claim 20:
Column 10, Line 11, "emulators" should be deleted and -- emulator -- should be inserted.

In Claim 20:
Column 10, Line 22, "display" should be deleted and -- the display -- should be inserted.

In Claim 23:
Column 10, Line 35, "medium" should be deleted and -- medium bearing -- should be inserted.

Signed and Sealed this
Seventh Day of January, 2020

Andrei Iancu
*Director of the United States Patent and Trademark Office*